United States Patent [19]

Noiret et al.

[11] Patent Number: 5,772,398
[45] Date of Patent: Jun. 30, 1998

[54] COOLED TURBINE GUIDE VANE

[75] Inventors: Isabelle Marie-Agnès Noiret, Melun; Jean-Claude Christian Taillant, Vaux le Penil, both of France

[73] Assignee: Societe Nationale d'Etude et de Construction de Moteurs d'Aviation "Snecma", Paris, France

[21] Appl. No.: 774,636

[22] Filed: Dec. 30, 1996

[30] Foreign Application Priority Data

Jan. 4, 1996 [FR] France ................................. 96 00038

[51] Int. Cl.⁶ .................................................... F04D 29/38
[52] U.S. Cl. .......................................... 415/115; 416/97 R
[58] Field of Search ..................................... 415/115, 116; 416/96 A, 97 R

[56] References Cited

U.S. PATENT DOCUMENTS

| | | | |
|---|---|---|---|
| 4,312,624 | 1/1982 | Steinbauer, Jr. et al. | |
| 4,413,949 | 11/1983 | Scott | 416/96 A |
| 4,946,346 | 8/1990 | Ito | 416/96 A |
| 5,207,556 | 5/1993 | Frederick et al. | 416/96 A |
| 5,399,065 | 3/1995 | Judo et al. | 415/115 |

FOREIGN PATENT DOCUMENTS

| | | |
|---|---|---|
| 0 034 961 | 9/1981 | European Pat. Off. . |
| 0 527 554 | 2/1993 | European Pat. Off. . |
| 0 562 944 | 9/1993 | European Pat. Off. . |
| 2.071.665 | 8/1971 | France . |
| 2.150.475 | 8/1972 | France . |
| 2 457 965 | 11/1974 | France . |
| 2 473 621 | 1/1980 | France . |
| 2 672 338 | 8/1992 | France . |

Primary Examiner—John T. Kwon
Attorney, Agent, or Firm—Oblon, Spivak, McClelland, Maier & Neustadt, P.C.

[57] ABSTRACT

A cooled turbine guide vane comprises a hollow aerodynamic portion between inner and outer platforms. The interior of the aerodynamic portion is partitioned into a leading edge duct and a main cavity in which a perforated tubular member is disposed, being spaced from the intrados and extrados side walls of the vane by longitudinal ribs. The tubular member is divided by a partition into two cavities on the intrados and extrados sides of the partition. A first cooling circuit is constituted by the leading edge duct and the intrados cavity of the tubular member, and a second cooling circuit is constituted by the extrados cavity and a cooling system for the inner platform, both circuits being supplied with air by the same source from the outer platform. Cooling air from each circuit passes through the perforations of the tubular member to impinge on the inside face of the respective side wall of the vane and is then guided towards the trailing edge where it escapes through slits in the trailing edge.

4 Claims, 4 Drawing Sheets

COOLED TURBINE GUIDE VANE

BACKGROUND OF THE INVENTION

1. Field of the Invention

The present invention relates to a cooled turbine guide vane.

The research into improving and optimising the performance of turbomachines, particularly aircraft engines, is never ending. This is particularly the case with the temperature which can be withstood at the inlet to the turbines. A rise of the level of this temperature leads to an improvement in the rate of fuel consumption, thus enabling the range of the aircraft to be increased or the fuel load to be decreased. This rise in temperature also leads to an increase in the thrust.

Present-day high performance turbomachines are equipped with turbine guide vanes which are able to withstand temperatures approaching 1600° C. Such vanes require a powerful cooling system and a very elaborate network of internal ducts.

2. Summary of the Prior Art

The state of the art is illustrated for example by EP-A-0562944, FR-A-2071665, FR-A-2473621, EP-A-0034961, EP-A-0527554 and FR-A-2672338, wherein cooling of the vanes is effected by two main processes: internal convection and protective film.

In one known construction, a cooled turbine guide vane comprises:

- an inner platform and an outer platform which, in use, define part of an annular main flow path for the hot gases from a gas engine;
- a hollow aerodynamic portion extending radially between the inner and outer platforms, and having leading and trailing edges separated by concave (intrados) and convex (extrados) side walls;
- a radial partition within the aerodynamic portion of the vane and dividing the interior thereof into a leading edge duct and a main cavity;
- a perforated tubular member mounted in the main cavity for receiving a flow of cooling fluid and directing this coolant against a portion of the inside faces of the side walls via the perforations of said member;
- spaced longitudinal ribs provided on said inside faces of the side walls and projecting into the main cavity to keep the tubular member spaced from the side walls; and
- slits in the trailing edge of the aerodynamic portion for the escape of coolant from the main cavity into the main flow path.

SUMMARY OF THE INVENTION

The invention has the aim of improving the cooling of a vane having this construction so as to achieve a very homogeneous temperature level between the intrados and extrados sides.

To this end, according to the invention, such a turbine guide vane is characterised by the provision of:

- a fluid-tight partition within said tubular member and extending between said inner and outer platforms to divide the interior of said tubular member into an intrados cavity on the side of said fluid-tight partition nearer said concave side wall and an extrados cavity on the side nearer said convex side wall;
- a closure wall closing said intrados cavity at its outer end;
- an inner sealing plate covering the inner end of said tubular member;
- means defining a passage through said radial partition and said tubular member adjacent said sealing plate;
- a cooling system for said platform;
- means defining an opening through said sealing plate to communicate said extrados cavity with said cooling system for said inner platform; and
- separate first and second cooling circuits which are supplied from said outer platform, said first cooling circuit including said leading edge duct, said passage and said intrados cavity, and said second cooling circuit including said extrados cavity, said opening and said cooling system for said inner platform.

Preferably, turbulence inducing devices are provided in the leading edge duct and/or on the inside faces of the side walls between the longitudinal ribs.

Also, bridging elements preferably connect the side walls downstream of the tubular member, i.e. between said tubular member and the trailing edge of the aerodynamic portion of the vane.

Other advantages and preferred features of the invention will become apparent from the following description of the preferred embodiment, given by way of example, with reference to the attached drawings.

DESCRIPTION OF THE PREFERRED EMBODIMENT

Figure 1:
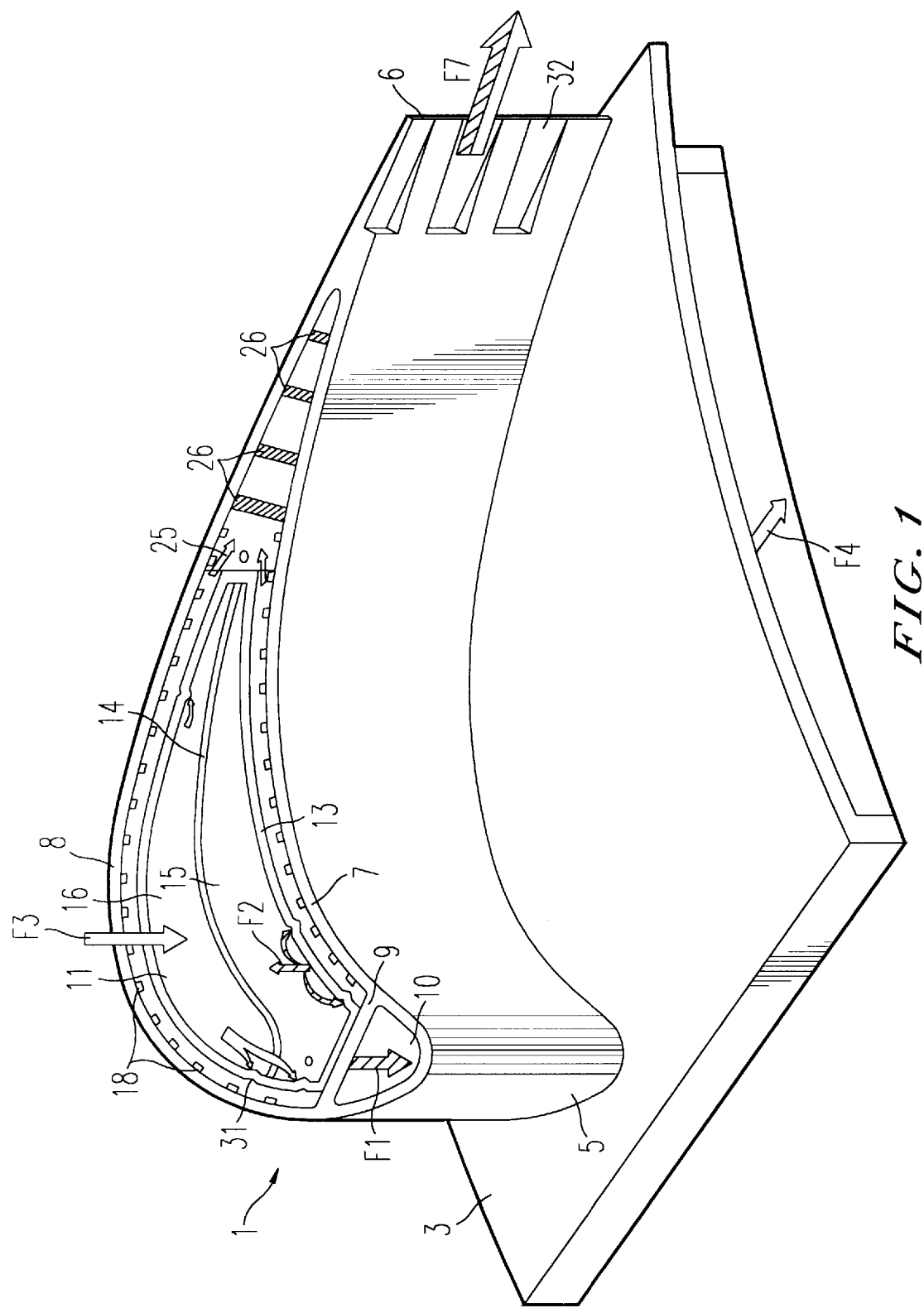
FIG. 1 shows a diagrammatic perspective view of a part of a vane in accordance with the invention, showing the inner platform and part of the aerodynamic portion of the vane.
Figure 2:
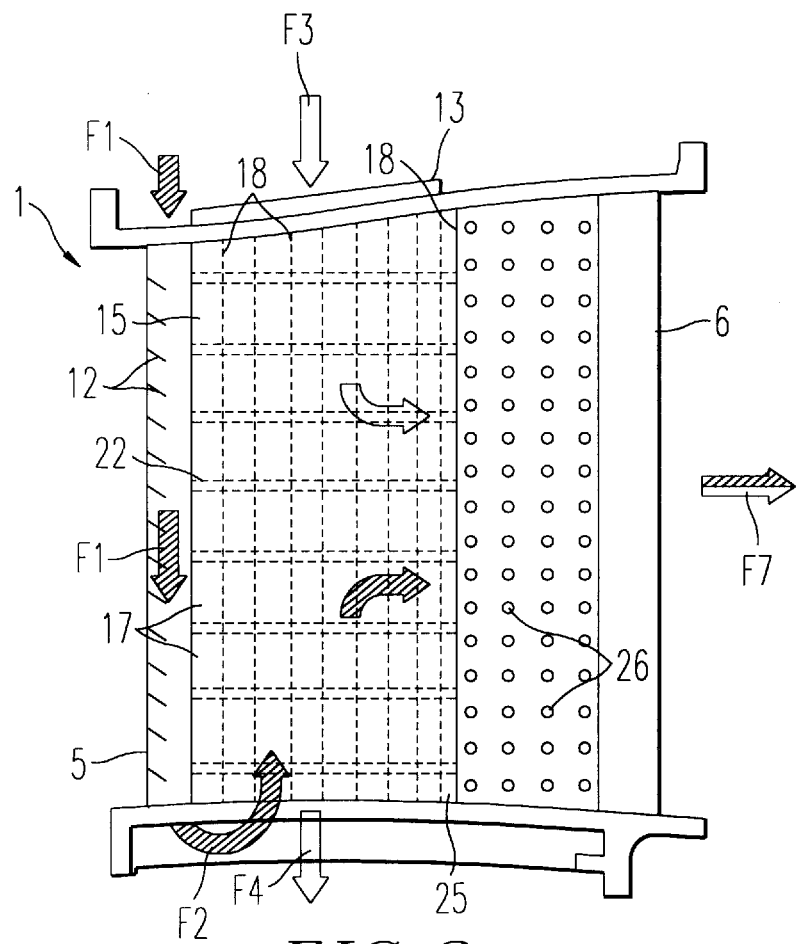
FIG. 2 is a sectional view along a median plane through the leading edge and the trailing edge of the vane of FIG. 1 showing diagrammatically the flow of coolant in the two cooling circuits.
Figure 3:
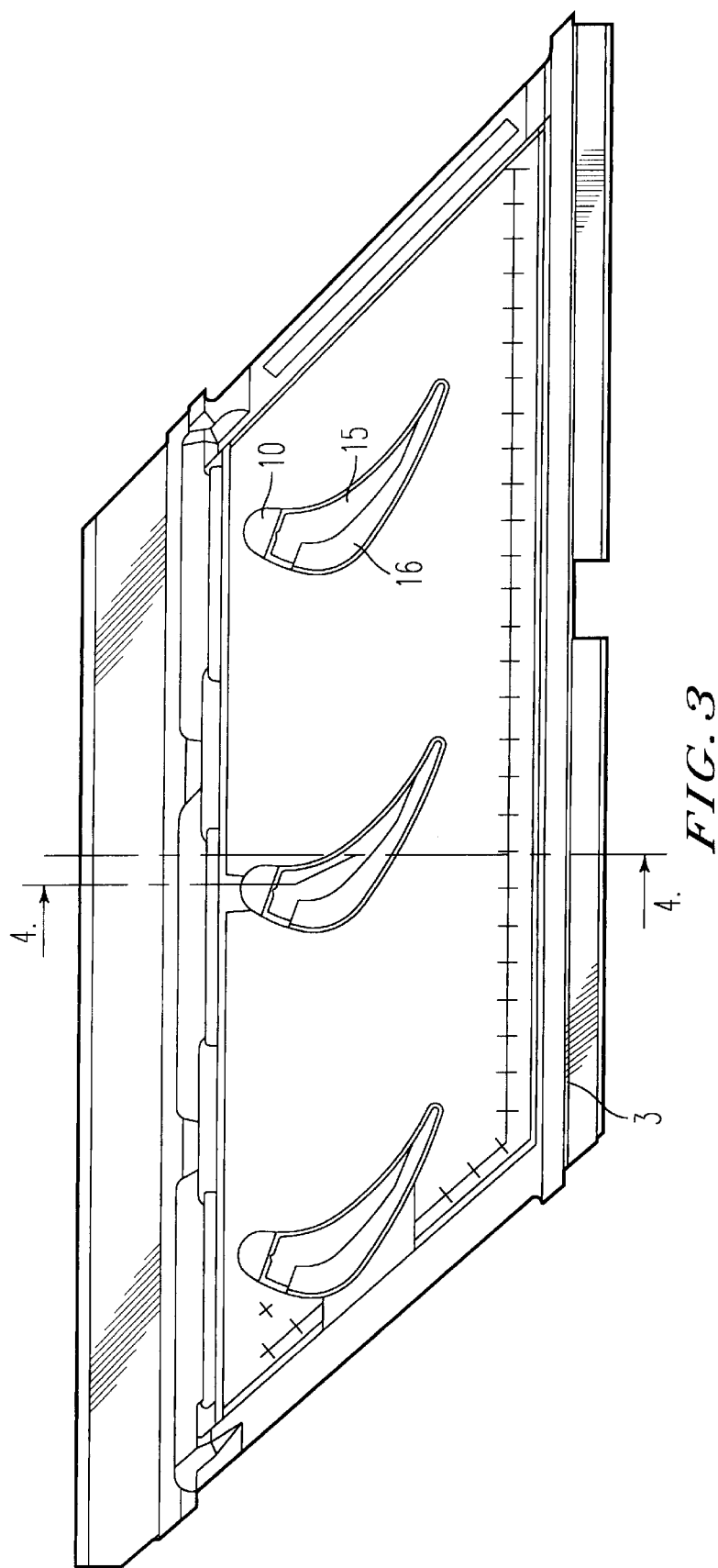
FIG. 3 is a developed perspective view of part of the inner platform of a turbine guide stage, showing the positions of three successive vanes; and, FIG. 4 is a sectional view of a vane along line IV—IV of FIG. 3.

The drawings shows a cooled turbine guide vane 1 which comprises a hollow aerodynamic portion 2 extending radially, relative to the axis of rotation of the turbine, between an inner platform 3 and an outer platform 4. The turbine guide is composed of a plurality of fixed vanes 1 arranged starwise and side by side so as to form an annular array bounded internally by the inner platforms 3 and externally by the outer platforms 4 to define a passage for the flow of hot gases between the vanes. These hot gases originate from the combustion chamber situated upstream from the guide, and are deflected by the aerodynamic portions of the fixed guide vanes so as to impinge on the movable blades of the turbine at a predetermined angle.

The aerodynamic portion 2 of the vane 1 has an upstream leading edge 5, a downstream trailing edge 6, and two side walls 7 and 8 interconnecting the leading and trailing edges 5 and 6. The side wall 7 is concave and forms the intrados face of the vane, and the side wall 8 is convex and forms the extrados face. A smooth radial partition 9 extending between the platforms 3 and 4 interconnects the side walls 7 and 8 and divides the interior of the portion 2 into a leading edge duct 10 and a main cavity 11 at the centre of the vane.

The leading edge duct 10 is situated in the vicinity of the leading edge 5 and is fitted with flow disturbing devices 12, which may slant inwards and towards the inner platform 3. The disturbing devices 12 are arranged on both the intrados and extrados side walls, and serve to promote heat exchange by forced convection.

A perforated tubular member 13 is situated in the main cavity 11. This member 13 includes a fluid-tight partition 14 which extends between the platforms 3 and 4 and in a direction substantially parallel to the chord of the vane 1, thereby dividing the main cavity 11 into an intrados cavity 15 situated on the side of the partition nearer the concave side wall 7 and an extrados cavity 16 situated on the side nearer the convex side wall 8.

The member 13 is guided and held in place by a plurality of longitudinal ribs 22 sited at different heights of the vane 1, the ribs projecting into the aerodynamic portion of the vane 1 from the side walls 7 and 8. In the ducts 17 situated between the ribs 22, aerodynamic flow disturbing devices 18 are provided on the inside faces of the side walls 7, 8 in order to promote internal heat exchange.

The intrados cavity 15 is closed at its end near the outer platform 4 by a closure wall 19.

Figure 4:
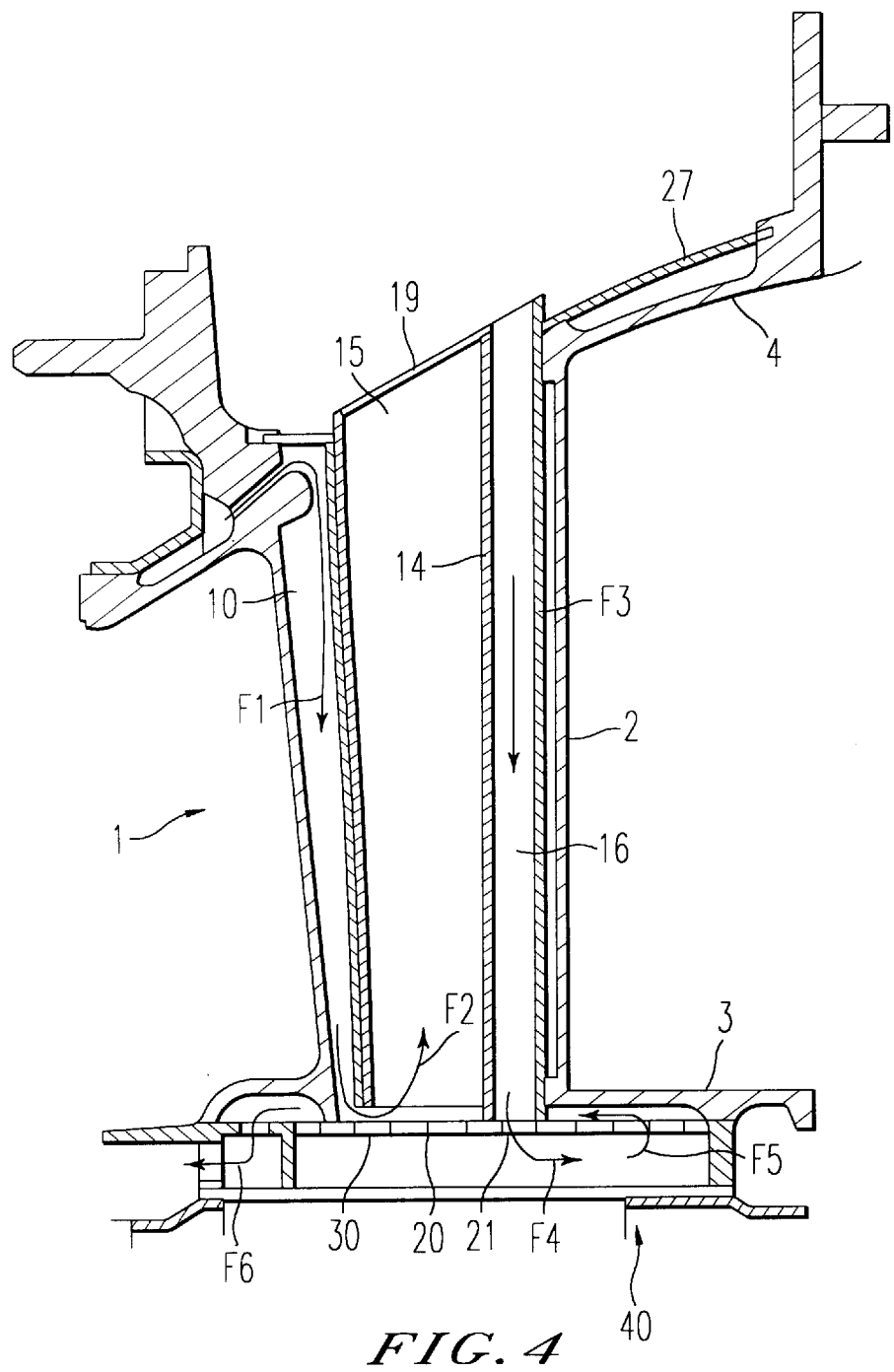

As will be seen more clearly in FIG. 4, the leading edge duct 10 and the intrados cavity 15 communicate with eachother via a passage 30 through the radial partition 9 and the member 13 at the foot of the vane, preferably above an inner sealing plate 20 covering the inner end of the member 13. This sealing plate 20 has an opening 21 which registers with the extrados cavity 16 so as to establish communication between this cavity and a cooling system 40 for the inner platform 3.

The ribs 22 provided on the intrados side and the ribs 22 provided on the extrados side extend as far as a mixing zone 25 situated downstream of the member 13. Between this mixing zone 25 and the trailing edge 6, the side walls 7 and 8 are interconnected by bridging elements 26 which form a mechanical connection between the two walls 7 and 8 and, in addition, means for disturbing the air flow downstream of the member 13. Slits 32 are provided in the trailing edge 6 on the intrados side for the exit of air from the interior of the vane.

The vane 1, the radial partition 9, the ribs 22, the disturbing devices 12 and 18, and the bridging elements 26 constitute a unitary part which can be produced by casting. The member 13 is a metallic part, and the components of the guide i.e. the vane 1, the member 13, the inner sealing plate 20 and the outer closure plate 27, are rigidly connected together such as by brazing.

The vane 1 described above possesses two internal circuits: a first circuit including the leading edge duct 10, the passage 30 and the intrados cavity 15; and a second circuit including the extrados cavity 16, the opening 21 and the system 40 for the cooling of the inner platform 3. These two circuits are supplied from the outer platform 4 by a common source of coolant, such as fresh air coming from a compressor, and join together in the mixing zone 25.

The leading edge duct 10 is thus supplied with fresh air which flows from the head towards the foot of the vane, in the direction of the arrow F1. This air cools the leading edge of the blade 1, and the flow of air thus reaches the foot of the member 13 and enters the intrados cavity 15 through the passage 30. As this air ascends in the intrados cavity 15, in the direction of the arrow F2, it escapes through the perforations 31 of the member 13 on its intrados side to impact on the side wall 7 before flowing between the longitudinal ribs 22 to the mixing zone 25.

The extrados cavity 16 is supplied at the head of the vane with air at the same temperature and pressure as that which is supplied to the leading edge duct 10, as it comes from the same source. This air flows through the extrados cavity 16 in the direction of the arrow F3, and some of it escapes through the perforations 31 of the member 13 on its extrados side to impact on the side wall 8 before flowing between the longitudinal ribs 22 to the mixing zone 25.

From the mixing zone 25, the two joined flows of air flow towards the trailing edge and out into the hot gas flow path through the slits 32 in the direction of the arrow F7.

The inner end of the extrados cavity 16 opens through the orifice 21 into a passage which enables the air to cool the inner platform 3 (arrows F4, F5) before the air is vented (arrow F6).

The disturbing devices 12 and 18 and the bridging elements 26 achieve a powerful stirring of the coolant.

Preferably, a localized widening is provided at the foot of the vane to facilitate the passage of the flow of cooling air from the leading edge duct 10 into the intrados cavity 15.

We claim:

1. A turbine guide vane comprising:

an inner platform and an outer platform which, in use, define part of an annular main flow path for the hot gases from a gas turbine;

a hollow aerodynamic portion extending radially between said inner and outer platforms, said aerodynamic portion having
    a leading edge,
    a trailing edge,
    a concave side wall between said leading and trailing edges, and
    a convex side wall between said leading and trailing edges;

a radial partition within said hollow aerodynamic portion and dividing the interior thereof into a leading edge duct and a main cavity;

a perforated tubular member disposed in said main cavity for receiving a flow of coolant and directing said coolant against the inside faces of said side walls via the perforations of said member;

spaced longitudinal ribs provided on said inside faces of said side walls and projecting into said main cavity to keep said tubular member spaced from said side walls;

slits provided in said trailing edge of said aerodynamic portion for the escape of coolant from the main cavity into said main flow path;

a fluid-tight partition within said tubular member and extending between said inner and outer platforms to divide the interior of said tubular member into an intrados cavity on the side of said fluid-tight partition nearer said concave side wall and an extrados cavity on the side nearer said convex side wall;

a closure wall closing said intrados cavity at its outer end;

an inner sealing plate covering the inner end of said tubular member;

means defining a passage through said radial partition and said tubular member adjacent said sealing plate;

a cooling system for said platform;

means defining an opening through said sealing plate to communicate said extrados cavity with said cooling system for said inner platform; and separate first and second cooling circuits which are supplied from said outer platform, said first cooling circuit including said leading edge duct, said passage and said intrados cavity, and said second cooling circuit including said extrados cavity, said opening and said cooling system for said inner platform.

2. A turbine guide vane according to claim 1, wherein turbulence inducing devices are provided in said leading edge duct.

3. A turbine guide vane according to claim 1, wherein turbulence inducing devices are provided on said inside faces of said side walls between said longitudinal ribs.

4. A turbine guide vane according to claim 1, wherein bridging elements interconnect said side walls between said tubular member and said trailing edge of said aerodynamic portion.

* * * * *